United States Patent [19]
Coon

[11] 3,921,949
[45] Nov. 25, 1975

[54] POLE TOP INSULATOR MOUNTING BRACKET

[75] Inventor: James D. Coon, Portland, Oreg.

[73] Assignee: Western Power Products, Inc., Hood River, Oreg.

[22] Filed: Nov. 21, 1973

[21] Appl. No.: 417,893

[52] U.S. Cl. ............................. 248/221; 248/230
[51] Int. Cl.² ................ H02G 7/20; H01B 17/12
[58] Field of Search ............ 248/221, 230, 231, 71; 174/163 R, 161 R, 158 R, 43

[56] References Cited
UNITED STATES PATENTS

| | | | |
|---|---|---|---|
| 1,050,364 | 1/1913 | Kobert | 248/65 |
| 2,022,386 | 11/1935 | Pittman | 248/71 |
| 2,883,135 | 4/1959 | Smalley | 248/230 |
| 2,970,800 | 2/1961 | Smalley | 248/230 |
| 3,266,775 | 8/1966 | Coe | 248/221 X |
| 3,445,582 | 5/1969 | Herrenkohl et al. | 174/149 R X |
| 3,480,747 | 11/1969 | Lankford | 174/161 R X |
| 3,649,740 | 3/1972 | Boyer | 174/149 R X |
| 3,704,001 | 11/1972 | Sloop | 248/221 |

*Primary Examiner*—J. Franklin Foss
*Attorney, Agent, or Firm*—Eugene M. Eckelman

[57] ABSTRACT

A bracket has a top plate for supporting an insulator. A body member depends from the top plate and comprises a plate of metal bent to form a longitudinal channel portion with a pair of side walls and a connecting wall. Side walls of the channel portion have flange extensions thereon which are bent angularly outwardly. The bracket is tapered to a narrower dimension toward the bottom in both its width and depth. The bracket is clamped or bolted to a pole and one embodiment thereof includes tooth means to firmly anchor the bracket against surface movement.

3 Claims, 9 Drawing Figures

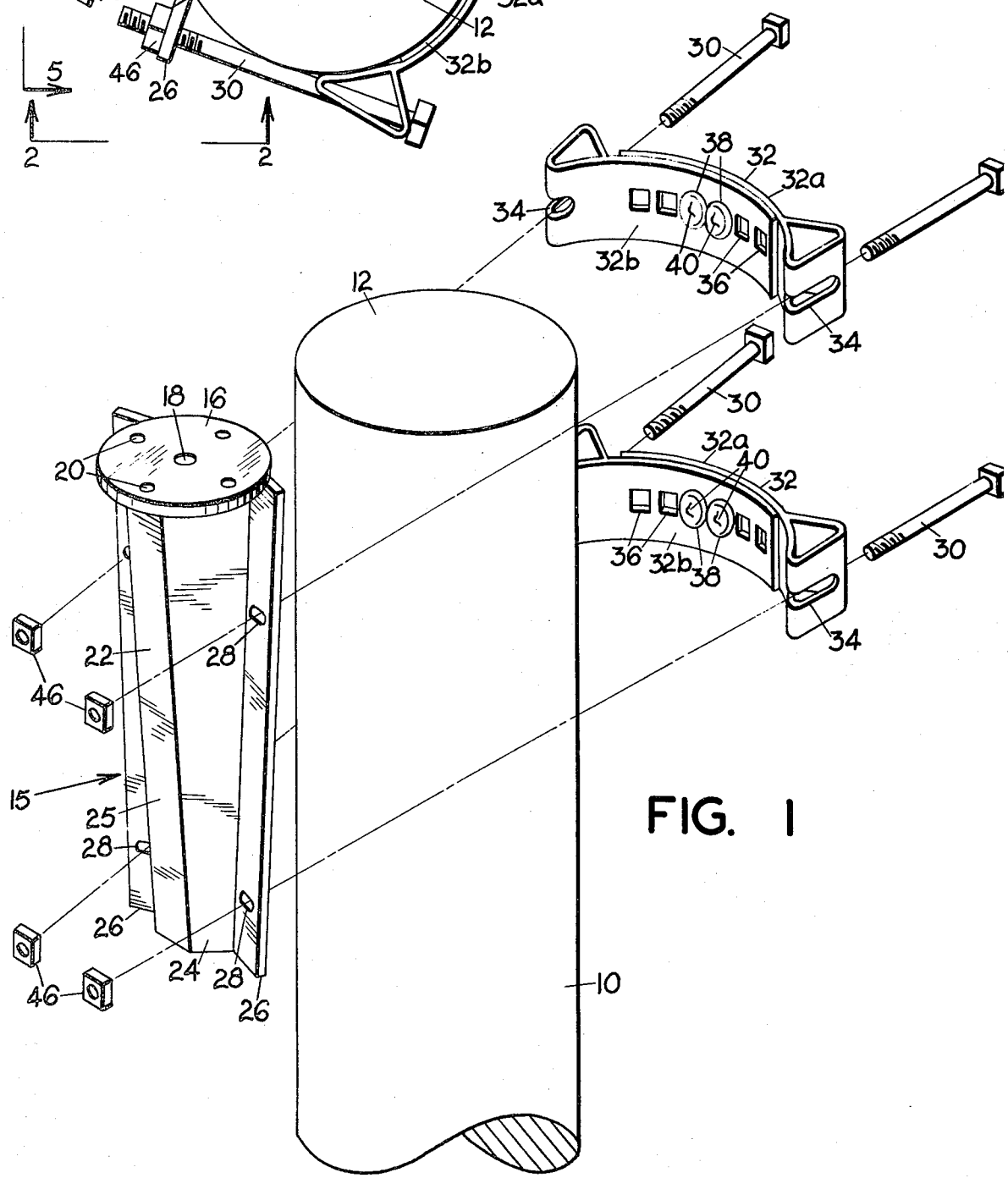
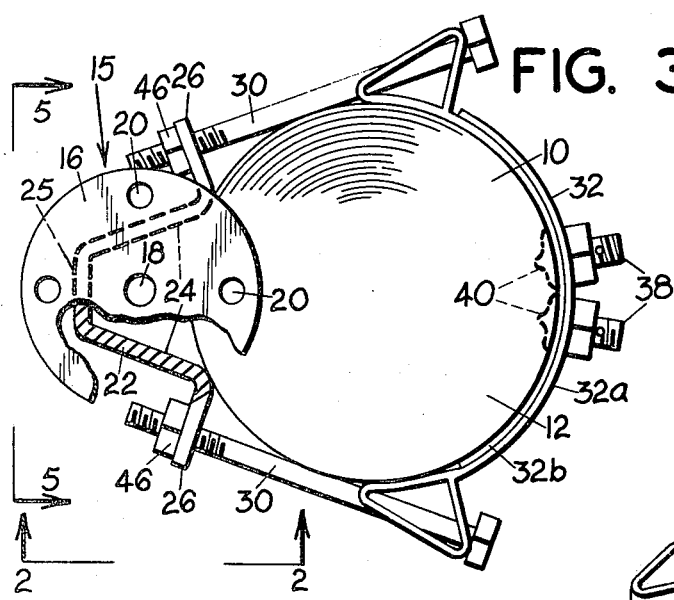
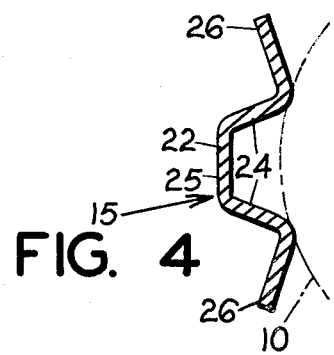

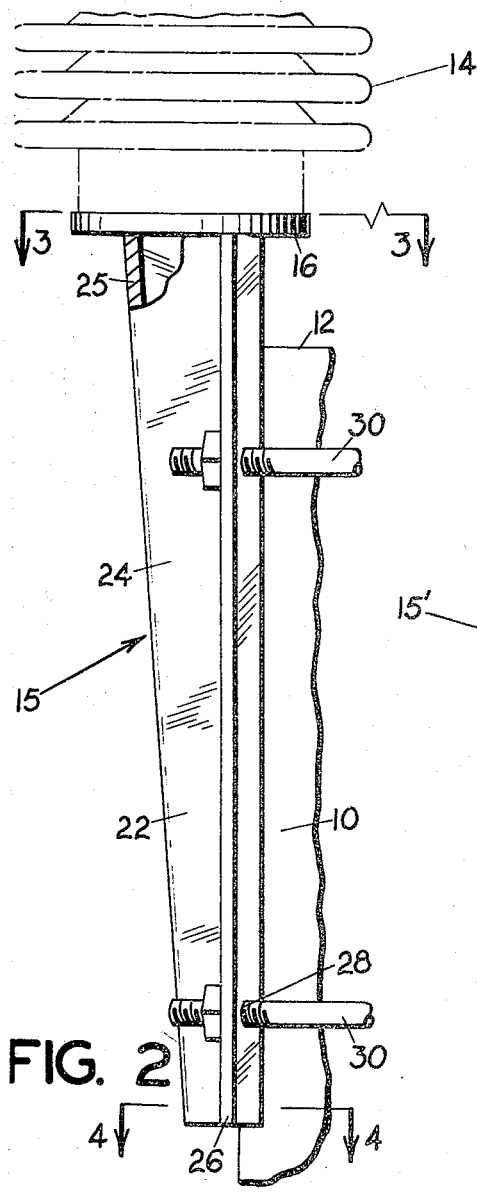
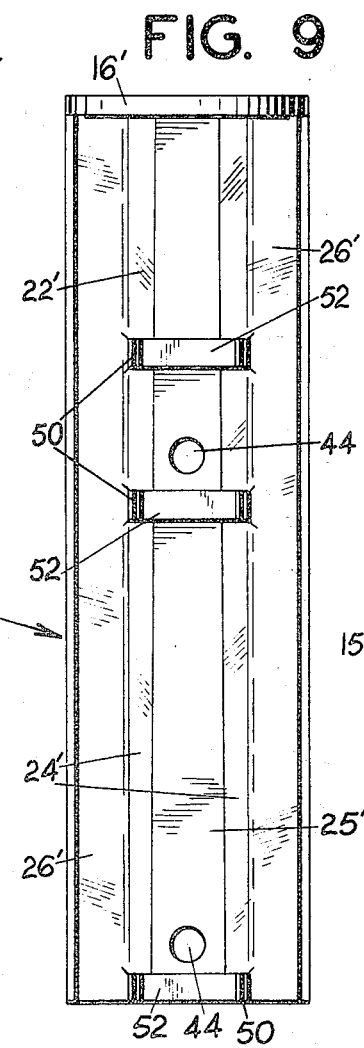
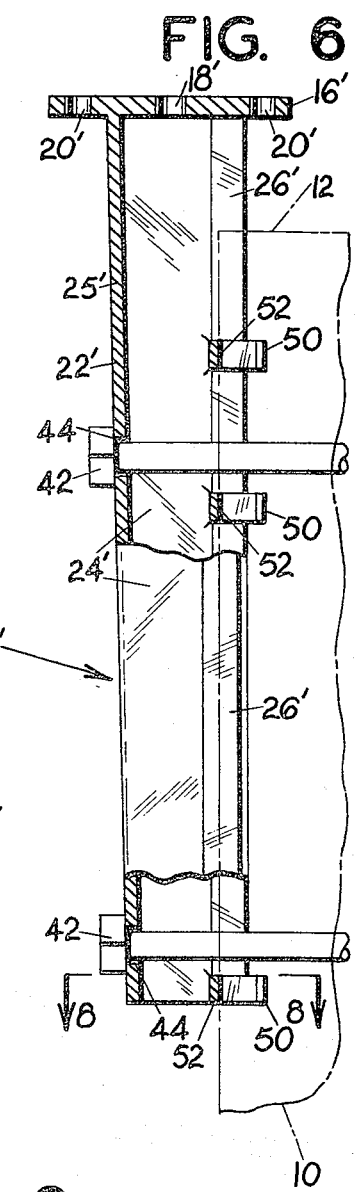
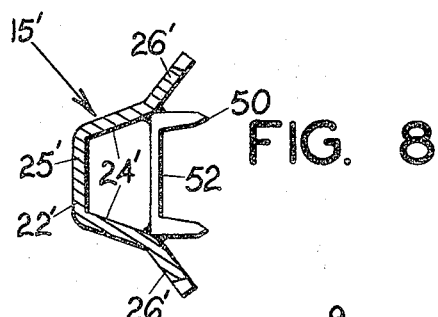
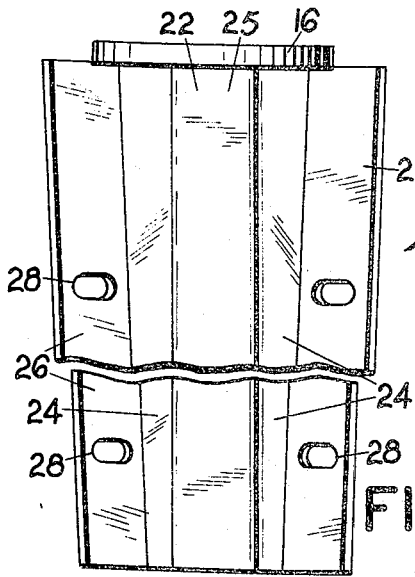
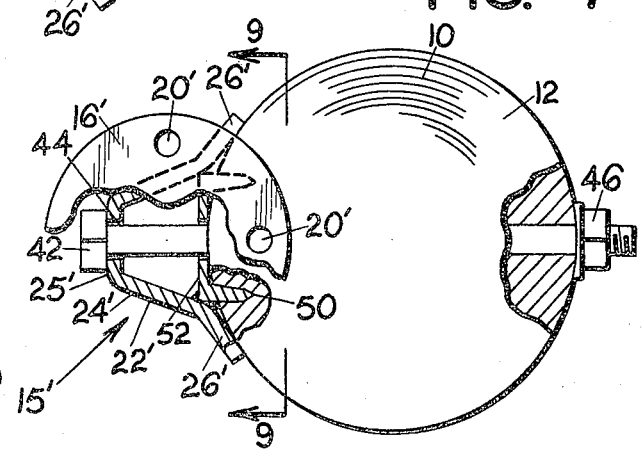

POLE TOP INSULATOR MOUNTING BRACKET

BACKGROUND OF THE INVENTION

This invention relates to new and useful improvements in pole top insulator mounting brackets.

High voltage lines such as those in the range of 69 kv to 115 kv are frequently supported on tall wooden poles. Such support is usually at the very top of the poles and is accomplished by brackets secured to the pole. Extremely high stresses are imposed on these brackets because of the heavy weight of the conductor and in addition because of wind load, ice load, conductor breakage, and other elements. The brackets are not only subjected to stress in the inline direction but wind may cause lateral stresses as well.

It is thus important that these brackets be capable of withstanding the necessary loading in both inline and lateral directions. It is also desired that these brackets be of attractive over-all appearance and somewhat matching silhouette to the power poles. Prior devices do not possess all the above set forth qualifications in that they do not provide an insulator holding bracket of the necessary rugged construction and yet one which provides a pleasing appearance for the intended purpose.

SUMMARY OF THE INVENTION

According to the present invention and forming a primary objective thereof, a pole top insulator mounting bracket is provided which has a novel structure making it rugged in construction to withstand all the necessary inline and lateral loading and at the same time employing an over-all silhouette providing a smooth, attractive transition from the pole to the insulator.

A more particular object of the present invention is to provide a pole top insulator mounting bracket of the type described having a top insulator supporting plate and a depending body member having a channel portion and outward flange extensions thereon, the body member being bent from a heavy plate of metal so as to be formed from one piece and thus not have the inherent disadvantages of multiple piece brackets or of castings.

Another object is to provide a bracket of the type described wherein both its over-all width and its depth is tapered to a narrower dimension toward the bottom to provide a pleasing silhouette on the pole and a smooth transition from the pole to the insulator, and at the same time to provide a minimum of metal accomplishing the desired strength.

Another object is to provide a bracket of the type described employing tooth means adapted to engage the pole when the bracket is secured in place so as to firmly anchor the bracket against surface movement on the pole.

The invention will be better understood and additional objects and advantages will become apparent from the following description taken in connection with the accompanying drawings which illustrate preferred forms of the device.

BRIEF DESCRIPTION OF THE DRAWINGS

FIG. 1 is an exploded perspective view of a first form of the present bracket in association with a power pole and means for holding the bracket on the pole;

FIG. 2 is a side elevational view of the bracket of FIG. 1 in slightly enlarged proportion and showing it mounted on a pole;

FIG. 3 is a top plan view taken on the line 3—3 of FIG. 2;

FIG. 4 is a sectional view taken on the line 4—4 of FIG. 2;

FIG. 5 is a foreshortened elevational view of the bracket taken on the line 5—5 of FIG. 3;

FIG. 6 is a side elevational view, partly broken away, of a second embodiment of the invention;

FIG. 7 is a top plan view of the embodiment of FIG. 6, this view also being partly broken away;

FIG. 8 is a sectional view taken on the line 8—8 of FIG. 6; and

FIG. 9 is an elevational view of the bracket of FIG. 6 taken on the line 9—9 of FIG. 7 with the pole omitted.

DETAILED DESCRIPTION OF PREFERRED EMBODIMENTS

With particular reference to the drawings, the numeral 10 illustrates an upper portion of a power pole in common use for supporting insulators at their upper end. Generally the top end 12 of such poles is sawed off flat. An insulator 14 shown in phantom lines in FIG. 2 is adapted to be secured in supported relation on the pole 10 through the medium of the present bracket.

Referring first to FIGS. 1 through 5, a first bracket embodiment 15 includes a top round plate 16 on which the insulator 14 is adapted to be seated and secured. This plate has a center aperture 18 and outer apertures 20. In use, the smaller, lesser voltage insulators use a center mount which comprises a bolt associated with the aperture 18 but in the larger, higher voltage insulators, they have bolts for connection through the apertures 20. The plate structure 16 thus described can accommodate different sizes of insulators by selective use of either the center or outside holes.

Integral with the plate 16 in depending relation is a body member 22 which as best seen in FIGS. 3 and 4 is channel-shaped in construction. Such body member is formed by a pair of side walls 24 and a connecting or channel bottom wall 25. The side walls are tapered to a narrower dimension from top to bottom, best seen in FIG. 2, whereby the depth of the bracket is less at the bottom than at the top. This taper is uniform.

Leading outwardly from the outermost portions of side walls 24 are flanges 26. These flanges lead outwardly at substantially right angles to the walls 24. Side walls 24 lead angularly from the connecting wall 25 in an obtuse angle only slightly greater than a right angle.

The flanges 26, having a substantially right angle extension from the walls 24, project outwardly from a pole 10 when the bracket abuts against a pole in vertical relation, FIGS. 3 and 4, and such flanges have apertures 28, FIG. 1, for receiving bolts 30 associated with segmental clamping band portions 32 adapted to engage the side of the post opposite from the bracket. The bolts 30 pass through apertures 34 in the band portions 32 and are bolted to the bracket by nuts 46 on the opposite side of the flanges 26 from the clamp. Band portions 32 are formed of two pieces 32a and 32b and have adjustable length by a plurality of matching holes 36 adapted to receive connecting bolts 38. Bolts 38 have tapered heads 40 which embed in the pole and firmly anchor the clamp 32 and thus the insulator holding bracket against surface movement on the pole.

As best seen in FIG. 5, the over-all width of the bracket is tapered in its longitudinal length, such taper being uniform and being of lessening dimension from top to bottom. The silhouette of the bracket therefore amounts to a double taper having a lesser dimension toward the bottom, namely, a taper in its over-all width and a taper in its depth.

FIGS. 6 through 9 show a second embodiment of bracket 15'. This bracket, as in the FIG. 1 embodiment, has a top plate 16' with insulator mounting apertures 18' and 20' and also has a depending body member 22'. This body member likewise is channel-shaped, having side walls 24' and a connecting wall 25', with outwardly directed flanges 26'. The side walls 24' are angled outwardly from the connecting wall 25' in an angle slightly greater than a right angle, as best viewed in FIGS. 7 and 8, and the flanges 26' extend outwardly at an obtuse angle to the walls 24' with the inner surfaces thereof lying generally flat against the pole when the bracket is installed in place.

The bracket tapers in its width from top to bottom, FIG. 9, such taper being uniform and having a taper to a lessening dimension from top to bottom. As viewed in FIG. 6, the walls 24' are also tapered to a lesser dimension toward the bottom so that the depth of the bracket is less at the bottom.

Bracket 15' is secured to a pole by bolts 42 which pass through apertures 44 in the wall 25' of the body member 22' as well as through suitable apertures bored in the pole so as to receive nuts 46 for clamping the bracket on the pole.

This bracket is provided with a plurality of teeth 50 which are arranged to penetrate into the pole when the bracket is secured in place. These teeth comprise projecting portions of U-shaped members 52 welded to the inside of the body member 22' at about the bend line between the side walls 24' and the flanges 26'. These U-shaped members are welded in place at desired locations through the length of the bracket, namely, such as one or more at the bottom and one or more at an upper portion.

Since the side walls 24' are tapered, the distance between the bend lines for the two side walls 24' and their respective flanges 26' would normally increase somewhat toward the top of the bracket, which would require different length members 52 or a build-up of weld metal at the ends of some of them. To compensate for this increased upward dimension so that uniform width U-shaped members can be used, the bend lines which form the bottom of the channel of the body member, namely, the bend lines between the connecting wall 25' and the side walls 24' have a reverse taper, as seen in FIG. 9, namely, they are tapered relative to each other in the direction opposite from the over-all taper of the bracket so as to be wider at the bottom than at the top. As stated, such compensates for the unequal width of the outer portion of the channel caused by the top to bottom tapering of walls 24' in the depth of the bracket. Therefore, uniform width U-shaped members 52 can be used.

In mounting the bracket embodiments of the invention on a pole, they are secured up against the pole with the plate 16 or 16' disposed a few inches above the top 12 of the pole. This allows a space under the plate on the one side of the bracket for workmen to install or remove the insulator. The brackets are mountable on poles of varying size because the clamp 32 shown in FIG. 1 can be adjusted as desired and the bolts 42 of FIG. 6 can merely be furnished of desired length. The bracket 15 is anchored against any undesired surface movement by the tapered bolt heads 40 which embed in the pole and the bracket 15' is held against any such surface movement by the teeth 50.

The structure of the present brackets has the advantage that said brackets can be bent from sheet steel or the like and thus do not have structural weaknesses inherent in cast products. The angular bends of the brackets provide a rugged product both in the inline direction, namely, along the direction of the conductor secured on the insulator and in lateral directions, thus providing a bracket which will not collapse under severe load conditions such as strong winds, ice, broken conductors, and the like.

The double taper of the bracket, namely, its over-all width and the taper of the walls 24 or 24' in its depth provides a pleasing silhouette of the bracket on a pole and provides a smooth transition from the pole to the insulator. In other words, the taper of the device, particularly its thickness, provides a smooth transition rather than an abrupt off-set. The taper in the width of the bracket also reduces the amount of metal required to produce the product, the narrowed portion being down on the pole where maximum strength is not required and the wider stronger portion being at the upper end where the moments of stress will be greatest.

It is to be understood that the forms of my invention herein shown and described are to be taken as preferred examples of the same and that various other changes in the shape, size and arrangement of parts may be resorted to without departing from the spirit of my invention, or the scope of the subjoined claims.

Having thus described my invention, I claim:

1. A single insulator mounting bracket for supporting an insulator at the top of a power pole comprising:
    a. a top plate having top and bottom surfaces,
    b. means in said plate for securing an insulator in supported relation on the top surface thereof,
    c. a single body member depending integrally from said top plate arranged for mounting engagement against one side only of a pole,
    d. said body member comprising a single piece of metal plate bent to form in cross section a longitudinal channel-shaped member having a pair of side walls and a connecting wall,
    e. said side walls of said body member having lesser width toward the bottom wherein said body member is tapered to less depth in upright direction toward the lower end thereof,
    f. said body member also comprising longitudinal flange extensions on said side walls bent angularly thereto in an outward direction,
    g. the overall width of said bracket between the outer edges of said flange extension being tapered to a narrowed dimension toward the bottom,
    h. said body member being arranged to be mounted on a pole with the open portion of the channel facing the pole,
    i. and one or more bolts extending from said bracket and arranged to be secured to a post.

2. The insulator mounting bracket of claim 1 wherein said flange extensions have apertures therein and said securing means comprise a length adjustable pole band arranged to be disposed on the opposite side of a pole from said bracket and bolts bolting said band and bracket in clamping engagement on the pole.

3. A single insulator mounting bracket for supporting an insulator at the top of a power pole comprising:
   a. a top plate having top and bottom surfaces,
   b. means in said plate for securing an insulator in supported relation on the top surface thereof,
   c. a single body member depending integrally from said top plate arranged to form a mounting engagement against one side only of a pole,
   d. said body member comprising a single piece of metal plate bent to form in cross section a longitudinal channel-shaped member having a pair of side walls and a connecting wall,
   e. said body member also comprising longitudinal flange extensions on said side walls bent angularly thereto in an outward direction,
   f. the overall width of said bracket between the outer edges of said flange extensions being tapered to a narrowed dimension toward the bottom,
   g. said body member being arranged to be mounted on a pole with open portion of the channel facing the pole,
   h. the width of said channel between said side walls being tapered to a narrowed dimension toward the top whereby to have a reverse taper to the overall width taper of the bracket and providing a uniform distance between the side walls at the bend between the side walls and the flange extensions,
   i. one or more bolts extending from said bracket and arranged to be secured to a post,
   j. and channel-shaped tooth means on said bracket secured to said body member at said bend between the side walls and the flange extensions and arranged to engage a pole when the bracket is secured in place by said bolts to firmly anchor the bracket against surface movement on the pole.

* * * * *